(No Model.)  C. P. PADMORE.  3 Sheets—Sheet 1.
BICYCLE.

No. 288,849.  Patented Nov. 20, 1883.

WITNESSES:
James J. Tobin
John E. Parker

INVENTOR:
Casper P. Padmore
by his Attorneys
Howson & Sons

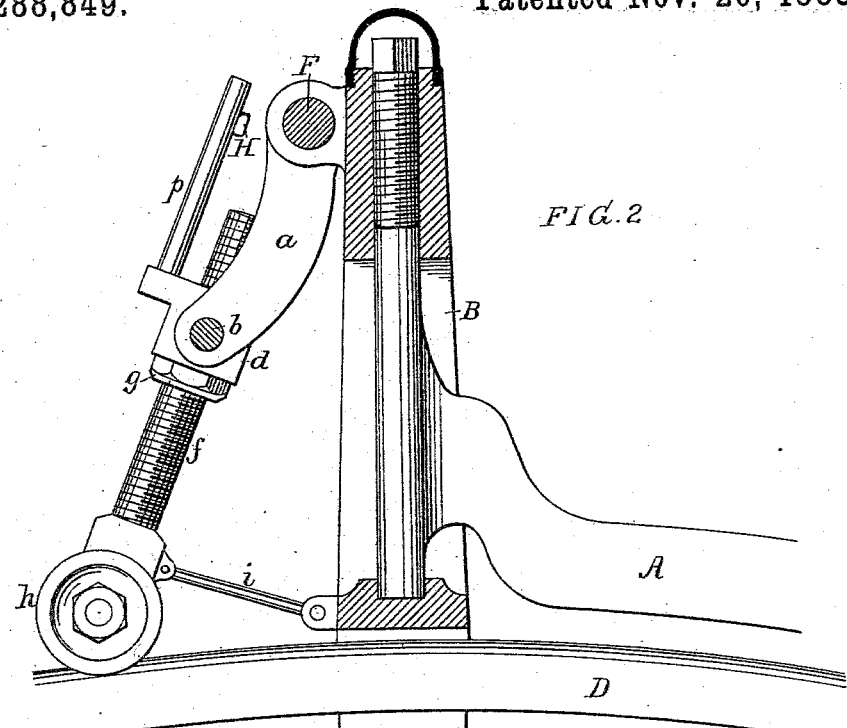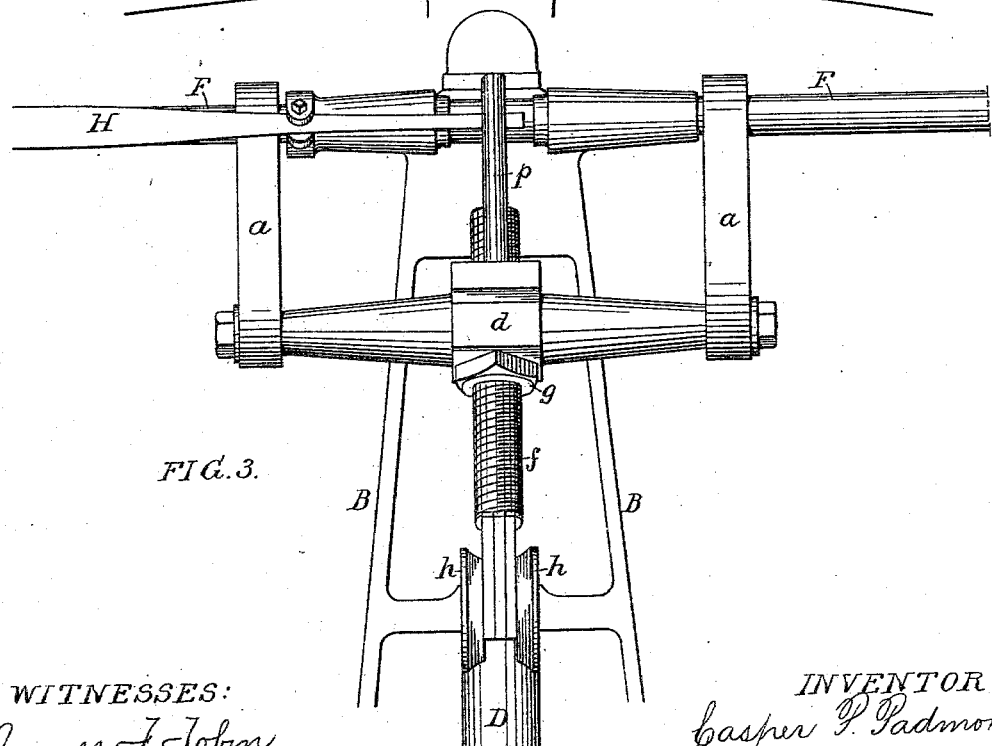

(No Model.) 3 Sheets—Sheet 3.

C. P. PADMORE.
BICYCLE.

No. 288,849. Patented Nov. 20, 1883.

WITNESSES:
James F. Tobin
John E. Parker

INVENTOR:
Casper P. Padmore
by his Attorneys
Howson & Sons

UNITED STATES PATENT OFFICE.

CASPER P. PADMORE, OF PHILADELPHIA, PENNSYLVANIA.

BICYCLE.

SPECIFICATION forming part of Letters Patent No. 288,849, dated November 20, 1883.

Application filed September 27, 1883. (No model.)

*To all whom it may concern:*

Be it known that I, CASPER P. PADMORE, a citizen of the United States, and a resident of Philadelphia, Pennsylvania, have invented certain Improvements in Bicycles, of which the following is a specification.

The object of my invention is to provide a bicycle with a device for preventing the accident known as a "header"—that is to say, the tipping up of the backbone and swinging forward of the steering-yoke over the driving-wheel, so as to throw the rider onto the ground in front of the machine. This object I attain by combining the steering-yoke with a retainer, whereby the forward movement of the yoke over the driving-wheel is prevented, all as fully described hereinafter.

Figure 1:
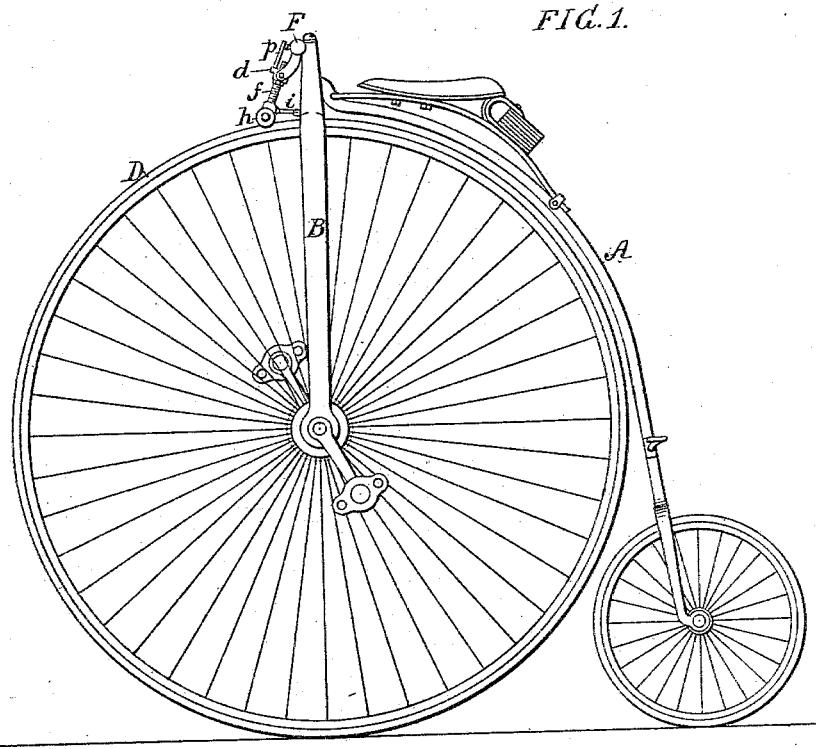
Figure 4:
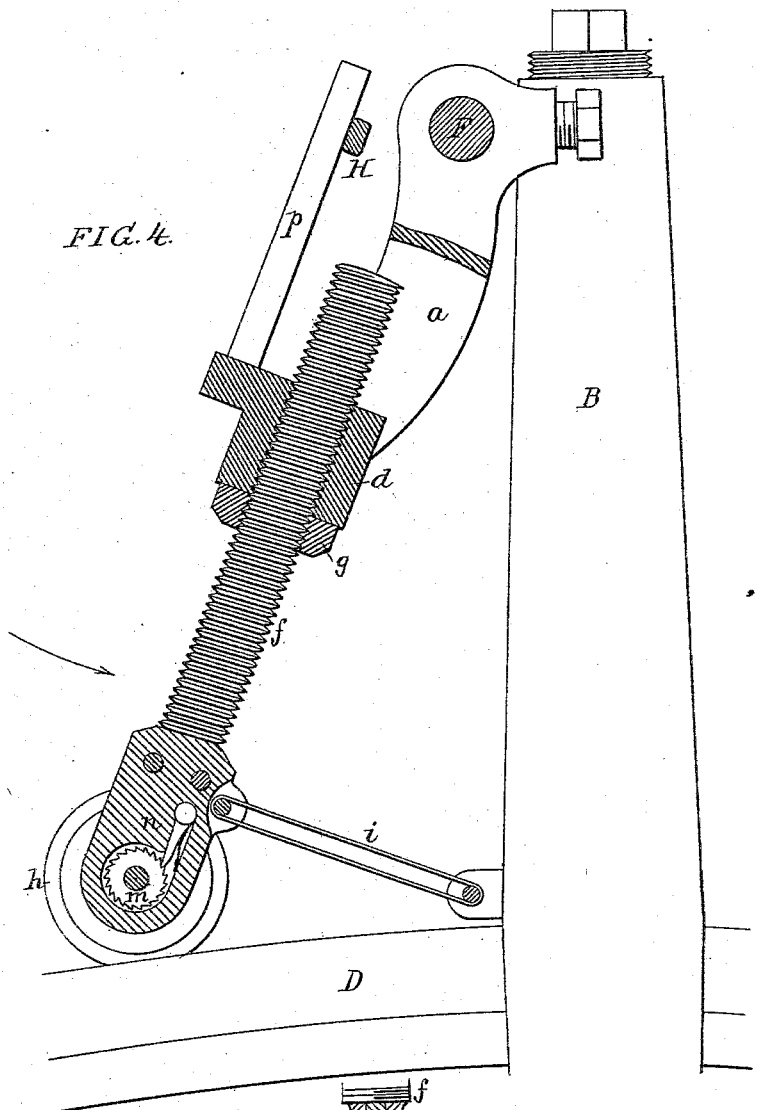
Figure 5:
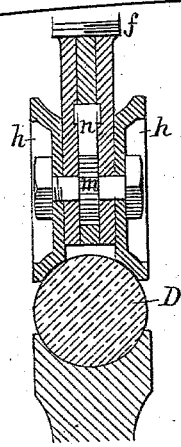

In the accompanying drawings, Figure 1, Sheet 1, is a side view of a bicycle with my improvement applied thereto; Fig. 2, Sheet 2, a sectional view, on an enlarged scale, of part of the bicycle; Fig. 3, a front view of the devices shown in Fig. 2; Fig. 4, Sheet 3, a view on a still larger scale, partly in section and partly in elevation, of the devices shown in Fig. 2; Fig. 5, a detached view of part of the device, and Fig. 6 a view of a modification.

In Fig. 1, A represents the backbone or reach of the bicycle; B, the steering-yoke pivoted to the upper front end of said backbone, and D the driving-wheel, which is journaled in the lower end of the yoke and turns laterally with the same, this turning of the yoke and wheel being effected by a steering-bar, F, secured to the upper end of the yoke.

The main objection to an ordinary bicycle is the frequency of the accident known as a "header," which is liable to occur whenever the driving-wheel meets with an obstruction of such a character as tends to materially retard its forward movement, there being in such case a sudden swinging forward of the steering-yoke over the wheel and a tipping up of the backbone and rear wheel, which results in the rider being thrown head first onto the ground in front of the machine. This objection I overcome by means of the devices which I will now proceed to describe, reference being had to Figs. 2, 3, 4, and 5 of the drawings.

Projecting from the steering-bar, on each side of the yoke B, is an arm, $a$, and to the outer ends of these arms is hung a bar, $b$. Forming part of this bar is a nut, $d$, to which is adapted a threaded rod, $f$, the latter, after adjustment, being locked in position by means of a jam-nut, $g$. The lower end of the rod $f$ carries a friction-roll, $h$, which bears upon the tire of the wheel D, a spring, $i$, acting upon the lower end of the rod $f$, and tending to draw the same inward and downward. By this means the roll is held continuously in contact with the tire of the wheel D, the spring counteracting any tendency which the roll might have to rise from the wheel, owing to the jarring of the machine when said wheel meets with an obstruction. The roll $h$ is divided for the reception of the lower end of the rod $f$, and on the spindle of said roll is a ratchet-wheel, $m$, Fig. 4, with which engages a pawl, $n$, hung within a recess in the lower end of the rod, this ratchet and pawl being such that they will not interfere with the backward movement of the roll $h$, due to its contact with the moving tire of the wheel D, but will lock the said roll and prevent any movement of the same in the opposite direction. It will thus be seen that as soon as there is any tendency of the frame comprising the yoke B and backbone A to swing forward over the wheel D the roll $h$ will bind upon the tire of said wheel D, the tendency of the rod $f$ being to swing inward, as shown by the arrow, Fig. 4, and thus firmly lock the frame of the bicycle to the wheel. In practice all that results is a slight, hardly perceptible shock, the tendency of the frame to tip up being instantly checked, and the hold of the roll $h$ on the wheel then released, so as not to interfere with the free forward movement of the said wheel.

Figure 6:
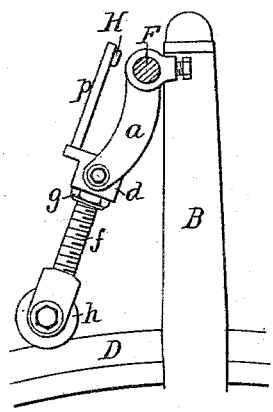

In the present instance I have adapted the locking device for use as an ordinary brake, the nut $d$ having an arm, $p$, which is under the control of the usual brake-lever, H, hung to the steering-bar. This, however, is not essential; nor is it necessary that the exact construction or location of the retaining device shown should be adhered to in all cases, as various modifications of the same within the scope of my invention will readily suggest themselves. For instance, the rod $f$ may be forked at the lower end, as shown in Fig. 6, so as to carry a roll which may be free to turn in both directions, reliance for the locking of the frame to the wheel D being placed upon the binding of the roll upon the rubber tire of the wheel when the rod $f$ swings inward; or the roll may be dispensed with and the lower end of the rod $f$ permitted to bear directly upon the tire of the wheel D, if desired, care being taken in this case, however, that the friction exerted is not sufficient to interfere with the rotation of the wheel.

I claim as my invention—

1. The combination of the driving-wheel and steering-yoke of the bicycle with a rod hung to the yoke, and a spring adapted to draw the lower end of the rod toward the tire of the wheel, as set forth.

2. The combination of the driving-wheel and steering-yoke of the bicycle, the nut $d$, hung to said yoke, and the rod $f$, adapted to said nut, and carrying a roller bearing on the tire of the wheel, as set forth.

3. The combination of the driving-wheel and steering-yoke of the bicycle, the pivoted nut $d$, having an arm, $p$, the rod $f$, adapted to the nut, and having a roller, $h$, and the brake-lever H, adapted to act upon the arm $p$, as set forth.

4. The combination of the driving-wheel and steering-yoke of the bicycle, the rod $f$, hung to the yoke, and carrying a roller, $h$, means for preventing said roller from turning in but one direction, and a spring adapted to draw the lower end of the rod $f$ toward the tire of the wheel, as set forth.

In testimony whereof I have signed my name to this specification in the presence of two subscribing witnesses.

CASPER P. PADMORE.

Witnesses:
  JOHN N. GITHENS,
  HARRY SMITH.